(12) United States Patent
Huang

(10) Patent No.: US 10,974,643 B1
(45) Date of Patent: Apr. 13, 2021

(54) WARNING LIGHT DEVICE FOR A BACKVIEW MIRROR

(71) Applicant: GIVING INDUSTRIAL CO.,LTD., Puxin Township, Changhua County (TW)

(72) Inventor: Tsung-Ming Huang, Puxin Township, Changhua County (TW)

(73) Assignee: GIVING INDUSTRIAL CO., LTD., Changhua County (TW)

( * ) Notice: Subject to any disclaimer, the term of this patent is extended or adjusted under 35 U.S.C. 154(b) by 0 days.

(21) Appl. No.: 16/730,956

(22) Filed: Dec. 30, 2019

(51) Int. Cl.
  *B60Q 1/50* (2006.01)
  *B60R 1/12* (2006.01)
  *B60Q 1/00* (2006.01)
(52) U.S. Cl.
  CPC ............. *B60Q 1/50* (2013.01); *B60Q 1/0017* (2013.01); *B60R 1/1207* (2013.01)
(58) Field of Classification Search
  CPC ...................................................... B60Q 1/50
  See application file for complete search history.

(56) References Cited

U.S. PATENT DOCUMENTS

| 8,963,701 | B2 * | 2/2015 | Rodriguez Barros | ....................... |
| | | | | B60Q 1/2665 |
| | | | | 340/438 |
| 9,013,288 | B2 * | 4/2015 | Foote ..................... | B60Q 1/525 |
| | | | | 340/435 |
| 2016/0318440 | A1 * | 11/2016 | Salter ................... | B60Q 1/2696 |

* cited by examiner

*Primary Examiner* — K. Wong

(57) ABSTRACT

A warning light device for a backview mirror has a backview mirror and a warning unit. The backview mirror has a casing and a mirror corresponding to each other. the mirror comprising a translucent region allowing the warning unit disposed in the casing to be aligned with the translucent region on the mirror. The warning unit has a lighting device, an illumination cover and a circuit board. The lighting device has a containment space and an opening connected to the containment space, the circuit board disposed in the containment space through the opening. The circuit board further comprising a plurality of illuminating members behind the opening; the illumination cover having a translucent plate configured to cover the opening; a plurality of illumination rods disposed in the containment space and in front of the translucent plate facing the illuminating members.

5 Claims, 6 Drawing Sheets

WARNING LIGHT DEVICE FOR A BACKVIEW MIRROR

BACKGROUND OF INVENTION

Field of Invention

The present invention relates to a warning light device, and more particularly to a blind spot warning device for a backview mirror.

Description of the Related Art

Typically, the backview mirror is installed on both sides of the vehicle, so that the driver can observe the situation behind the both sides of the vehicle through the backview mirror. It can also be used to determine whether there are coming vehicles on both sides of the vehicle, so as to be alert before changing lanes and make early preparations. However, even with the backview mirror, there are still blind spot areas that cannot be fully observed from the rear side of the vehicle. Therefore, many car manufacturers have introduced the technology of the backview mirror with blind spot warning lighting for vehicles as standard.

The blind spot warning light device is usually installed in the casing of the backview mirror of the vehicle, and is connected to the sensors on both sides of the vehicle. When the rear vehicle enters the blind spot area, the blind spot warning light device can be activated by the sensors, so that the illuminated LED source can be emitted from the translucent region of the mirror, to achieve the effect of reminding the driver to pay attention.

However, the conventional structure described above still has the following issues in practical applications: LED lights are point light sources emitted in a straight line, when used in a night environment, it can be extremely dazzling, which can cause glaze and hazard to the driver.

Therefore, it is desirable to provide a warning light device for a backview mirror to mitigate and/or obviate the aforementioned problems.

SUMMARY OF THE INVENTION

An objective of present invention is to provide a warning light device for a backview mirror, which is capable of improving the above-mention problems.

In order to achieve the above mentioned objective, a warning light device for a backview mirror has a backview mirror and a warning unit. The backview mirror has a casing and a mirror corresponding to each other. The mirror has a translucent region allowing the warning unit disposed in the casing to be aligned with the translucent region on the mirror. The warning unit has a lighting device, an illumination cover and a circuit board. The lighting device has a containment space and an opening connected to the containment space, the circuit board disposed in the containment space through the opening. The lighting device further has a through aperture on one side for accepting wires of the circuit board; the circuit board further comprising a plurality of illuminating members behind the opening. The illumination cover has a translucent plate configured to cover the opening. A plurality of illumination rods are disposed in the containment space and in front of the translucent plate facing the illuminating members, and the illumination rods is cone-shaped, secured onto the mirror via the lighting device, and keeps the translucent plate facing the translucent region.

Other objects, advantages, and novel features of invention will become more apparent from the following detailed description when taken in conjunction with the accompanying drawings.

DETAILED DESCRIPTION OF THE PREFERRED EMBODIMENT

Figure 1:
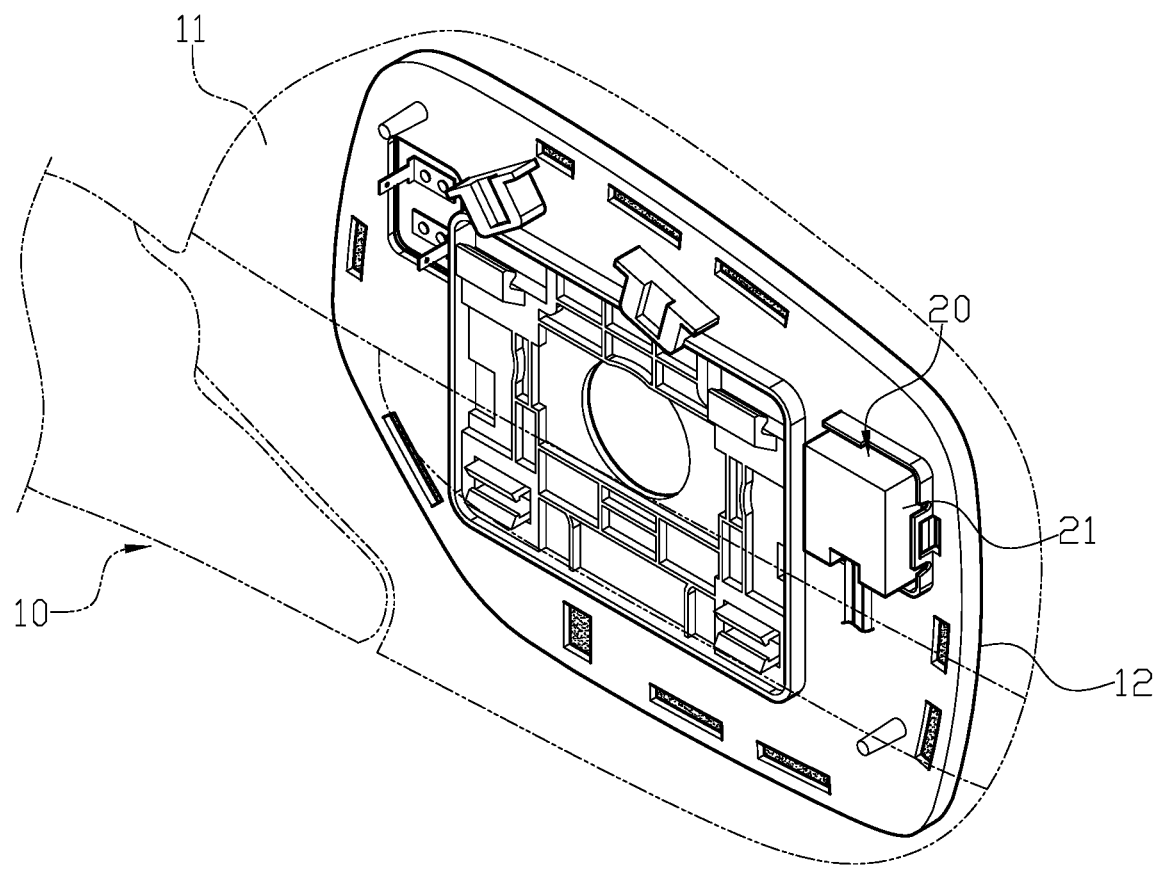
FIG. 1 is perspective assembly drawing of a preferred embodiment of the present invention.
Figure 2:
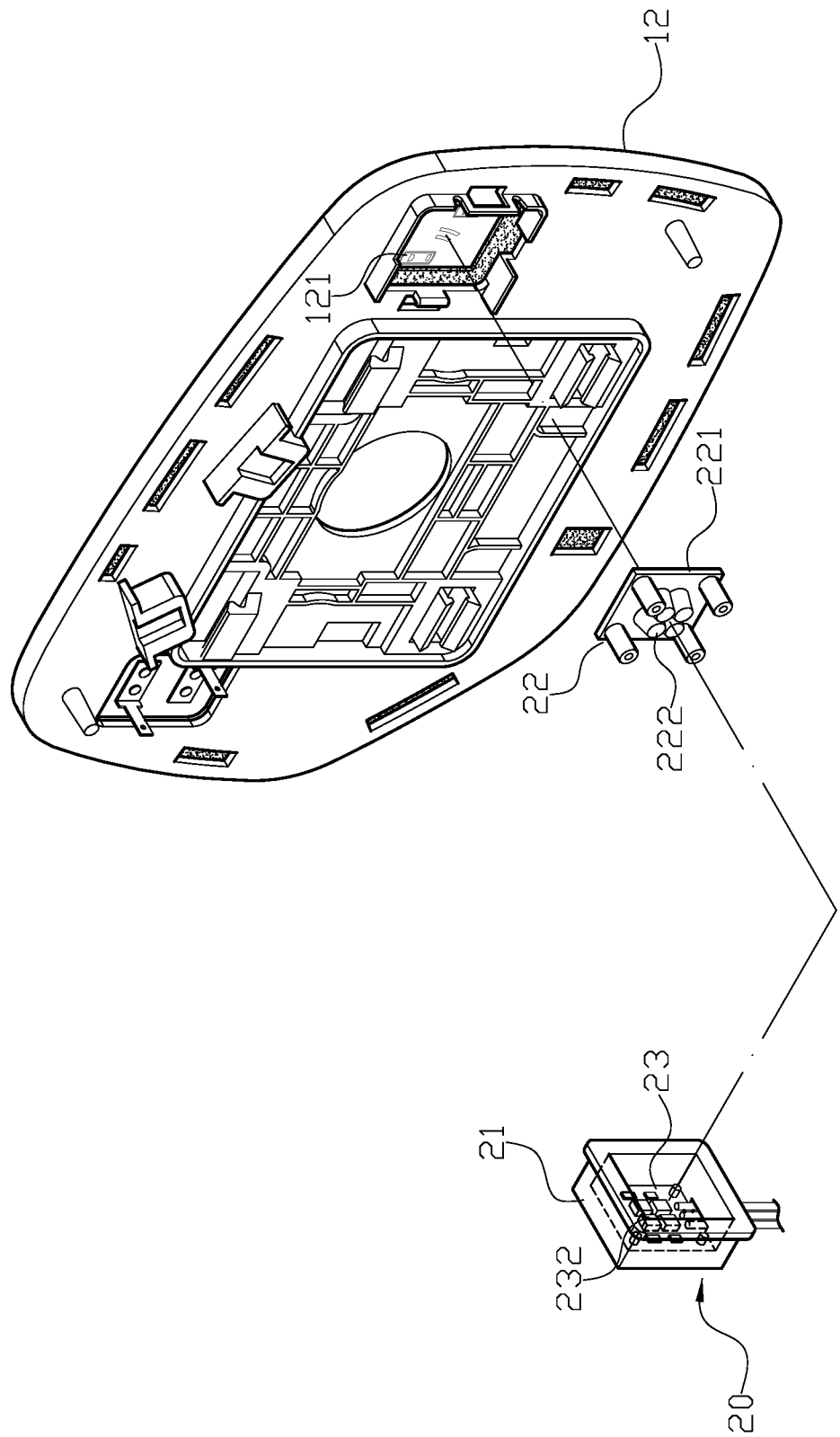
FIG. 2 is an exploded perspective drawing of the preferred embodiment of the present invention.
Figure 3:
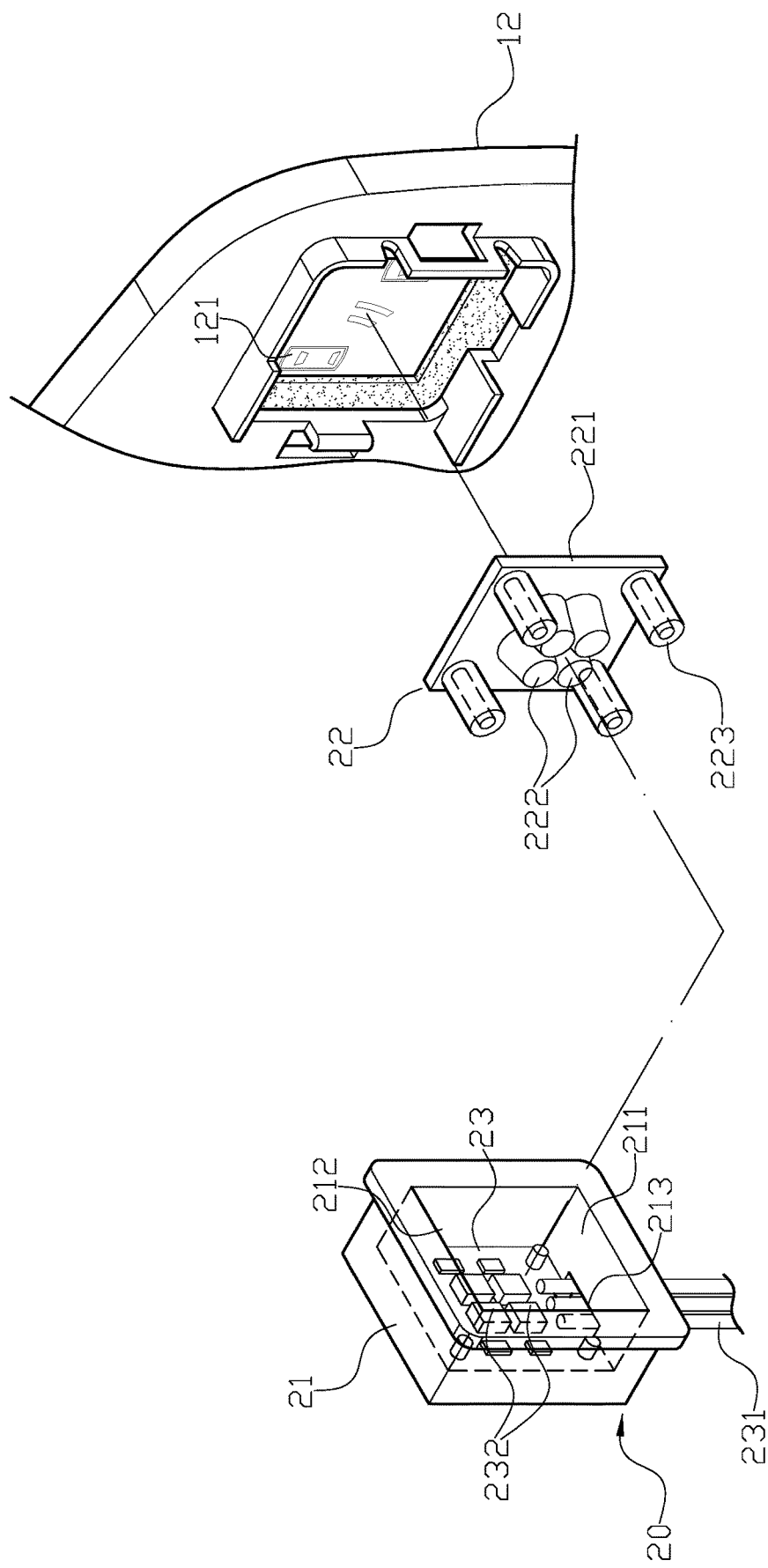
FIG. 3 is a partially enlarged drawing of the preferred embodiment of the present invention.
Figure 4:
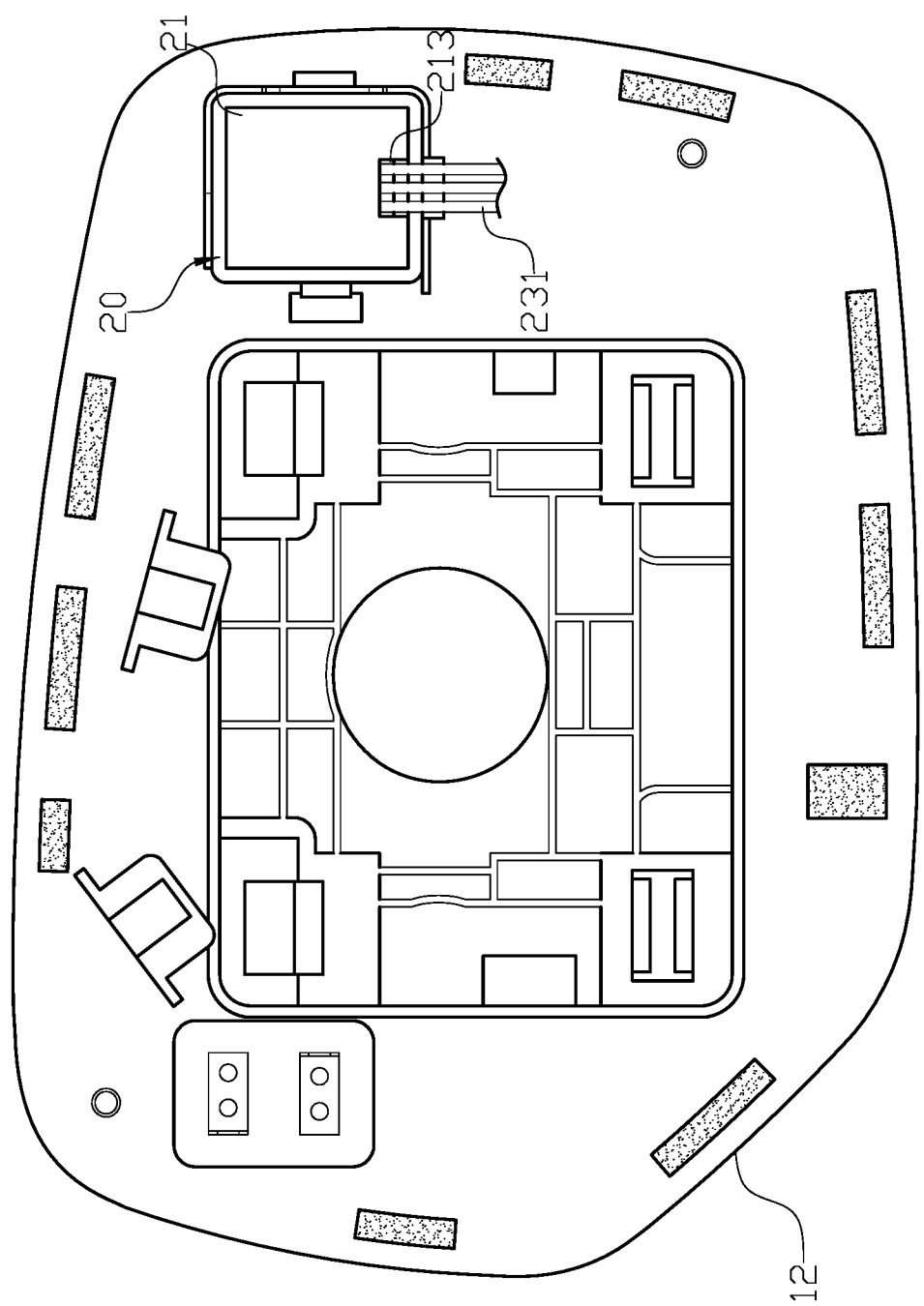
FIG. 4 is a combined plan drawing of the preferred embodiment of the present invention.

First, please refer to FIGS. 1-4. A warning light device for a backview mirror comprises: a backview mirror 10 and a warning unit 20. The backview minor 10 has a casing 11 and a minor 12 corresponding to each other. The minor 12 comprises a translucent region 121 allowing the warning unit 20 disposed in the casing 11 to be aligned with the translucent region 121 on the minor 12. Since the minor 12 faces backward, the moving direction of the vehicle is forward. The warning unit 20 has a lighting device 21, an illumination cover 22 and a circuit board 23. The lighting device 21 comprises a containment space 211 and an opening 212 connected to the containment space 211. the circuit board 23 is disposed in the containment space 211 through the opening 212, and a through aperture 213 provided on one side of the lighting device 21 is designed for accepting wires 231 of the circuit board 23. The circuit board 23 further comprises a plurality of the illuminating members 232 behind the opening 212, and the illumination cover 22 further has a translucent plate 221. When the illumination cover 22 covers the lighting device 21, the translucent plate 221 seals the opening 212. A plurality of illumination rods 222 are disposed in the containment space 211 and in front of the translucent plate 221 facing the illuminating member 232. Furthermore, the illumination rod 222 is cone-shaped, secured onto the mirror 12 via the lighting device 21 and keeps the translucent plate 221 facing the translucent region 121.

Moreover, a supporting foot 223 respectively extends from four corners of the translucent plate 221 and is configured to lift the illumination cover 22 in the lighting device 21.

In addition, the circuit board 23 further has four illuminating members 232.

Furthermore, the circuit board 23 further has two red illuminating members 232 and two orange illuminating members 232. When the sensors sense the vehicle approaching, the orange illuminating member 232 is activated; when the sensors sense the vehicle approaching and the driver still puts on changing line signal, the red illuminating member 232 is activated.

Moreover, the illuminating member 232 is a LED lamp.

Figure 5:
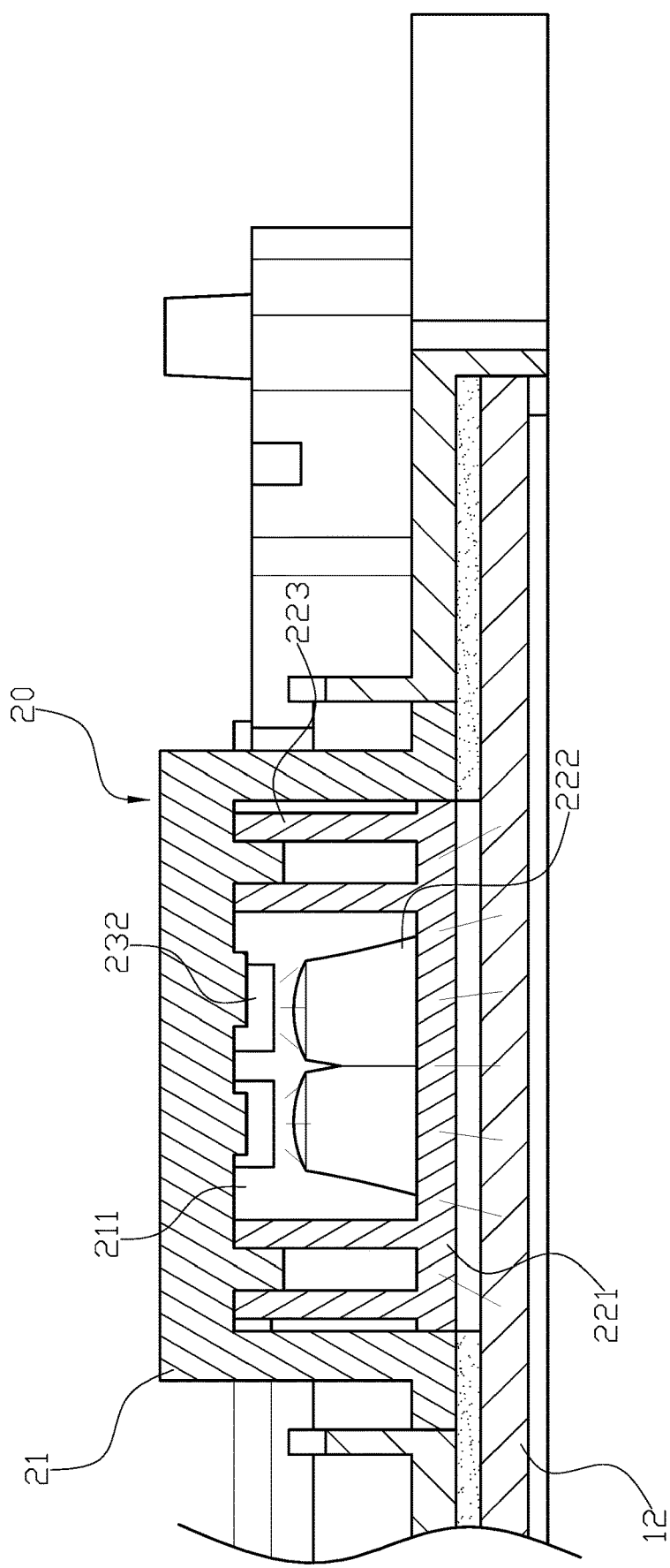
FIG. 5 shows a uniform diffusion pattern of light according to the preferred embodiment of the present invention.
Figure 6:
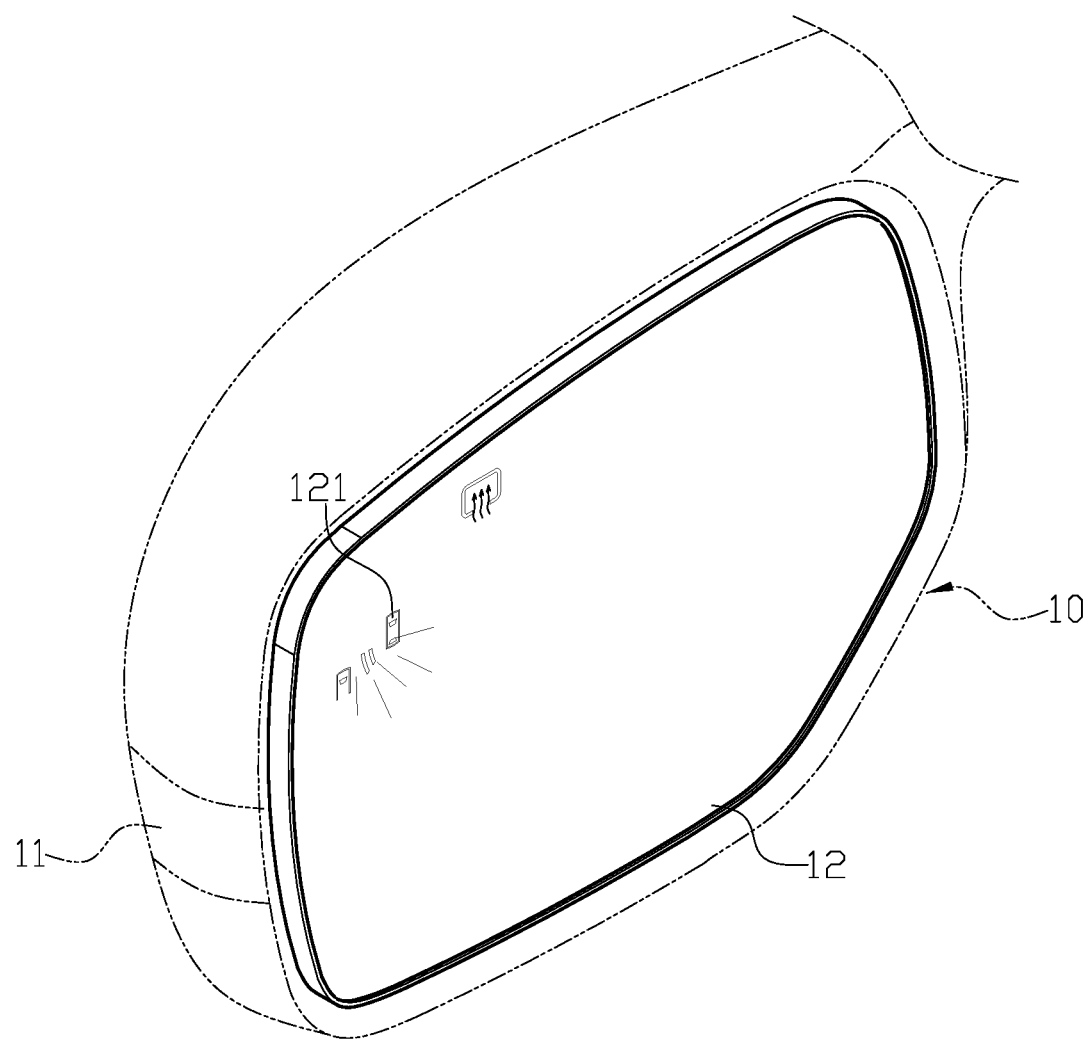
FIG. 6 shows a light emitting state of a blind spot warning according to the preferred embodiment of the present invention.

In actual use, the warning unit 20 is connected to the sensors on both sides of the vehicle. When the rear vehicle enters the blind spot area of the backview mirror 10, the illuminating member 232 can be illuminated by the induction of the sensors, so that the emitted light can be emitted from the translucent region 121 of the mirror 12, to achieve the warning effect to the driver to pay attention. When the illuminating member 232 lights up, it uses the surface of the illumination rod 222 to diffuse the light diffuses evenly around, and the light is emitted from the translucent plate 221 through the translucent region 121. Please refer TO FIG. 5 and FIG. 6, the indirect and uniformly diffused light can greatly reduce the glare used in the night environment and avoid causing fright to the driver.

Although the present invention has been explained in relation to its preferred embodiment, it is to be understood that many other possible modifications and variations can be made without departing from the spirit and scope of invention as hereinafter claimed.

What is claimed is:

1. A warning light device for a backview mirror comprising:
   a backview mirror, and
   a warning unit, wherein:
   the backview mirror has a casing and a mirror corresponding to the casing, the mirror comprising a translucent region configured for the warning unit disposed in the casing to be aligned with the translucent region on the mirror; and
   the warning unit has a lighting device, an illumination cover, and a circuit board, the lighting device comprising:
   a containment space and an opening connected to the containment space, the circuit board disposed in the containment space; and
   a through aperture for accepting a wire of the circuit board;
   the circuit board further comprising a plurality of illuminating members behind the opening;
   the illumination cover having a translucent plate configured to cover the opening; and
   a plurality of illumination rods disposed in the containment space and in front of the translucent plate facing the illuminating members, the illumination rods being cone-shaped and extending from a surface of the translucent plate.

2. The warning light device for a backview mirror as claimed in claim 1, wherein a supporting foot respectively extends from four corners of the translucent plate and is configured space the illumination cover in the lighting device.

3. The warning light device for a backview mirror as claimed in claim 1, wherein the circuit board further has four illuminating members.

4. The warning light device for a backview mirror as claimed in claim 1, wherein the circuit board further has two red illuminating members and two orange illuminating members.

5. The warning light device for a backview mirror as claimed in claim 1, wherein the illuminating member is an LED lamp.

* * * * *